United States Patent
Kaku et al.

(10) Patent No.: US 9,102,253 B2
(45) Date of Patent: Aug. 11, 2015

(54) VEHICLE SEAT

(75) Inventors: Hiroyuki Kaku, Tochigi (JP); Jogen Yamaki, Saitama (JP); Hisato Oku, Saitama (JP)

(73) Assignees: TS TECH CO., LTD., Saitama (JP); HONDA MOTOR CO., LTD., Tokyo (JP)

(*) Notice: Subject to any disclaimer, the term of this patent is extended or adjusted under 35 U.S.C. 154(b) by 91 days.

(21) Appl. No.: 13/808,851

(22) PCT Filed: Jul. 6, 2011

(86) PCT No.: PCT/JP2011/065444
§ 371 (c)(1),
(2), (4) Date: Jan. 7, 2013

(87) PCT Pub. No.: WO2012/005283
PCT Pub. Date: Jan. 12, 2012

(65) Prior Publication Data
US 2013/0113243 A1    May 9, 2013

(30) Foreign Application Priority Data

Jul. 9, 2010    (JP) ................................. 2010-157271

(51) Int. Cl.
*B60N 2/42*        (2006.01)
*B60N 2/427*       (2006.01)

(52) U.S. Cl.
CPC .......... *B60N 2/42709* (2013.01); *B60N 2/4235* (2013.01)

(58) Field of Classification Search
CPC ..... B60N 2/4235; B60N 2/42709; B60N 2/68
USPC .......................................... 297/216.1, 216.13
See application file for complete search history.

(56) References Cited

U.S. PATENT DOCUMENTS 6,299,239 B1 * 10/2001 Sagawa et al. ........... 296/187.12
7,448,674 B2 * 11/2008 Brunner et al. .......... 296/193.02
(Continued)

FOREIGN PATENT DOCUMENTS

CN        1133578 A      10/1996
EP        1 857 320      11/2007
(Continued)

OTHER PUBLICATIONS

Office Action issued in counterpart Chinese Patent Application No. 201180033842.1 (May 6, 2015) of co-pending U.S. Appl. No. 13/809,087, and corresponding English translation.

*Primary Examiner* — David R Dunn
*Assistant Examiner* — Jody Giacoman
(74) *Attorney, Agent, or Firm* — Hamre, Schumann, Mueller & Larson, P.C.

(57) ABSTRACT

A vehicle seat comprises: left and right base frames (side portions 52, 53 of a pipe frame 5) which constitute left and right portions of a seat back frame (2); a force-receiving member (bracket 7) disposed adjacent to a left or right outer side of one base frame (side portion 53), and configured to receive a load from outside in a lateral direction; and a load transmission part (a lower frame 6 and a lower portion 51 of the pipe frame 5) configured to transmit the load from the force-receiving member to a side laterally opposite to that on which the force-receiving member is provided. The force-receiving member has a shape with a closed cross section, and has an input-side end portion (7a) and an output-side end portion (7b), such that the input-side end portion stretches out in at least one of upward, downward, frontward and rearward directions wider than the output-side end portion.

4 Claims, 5 Drawing Sheets

(56) References Cited

U.S. PATENT DOCUMENTS

| | | |
|---|---|---|
| 7,631,926 B2 * | 12/2009 | Fonseka et al. .......... 296/187.12 |
| 8,226,156 B2 | 7/2012 | Shiono et al. |
| 8,292,353 B2 * | 10/2012 | Ishimaru et al. ......... 296/193.06 |
| 2002/0024241 A1 | 2/2002 | Umezawa et al. |
| 2009/0021061 A1 | 1/2009 | Yamaki et al. |
| 2010/0244485 A1 * | 9/2010 | Tanaka et al. ............ 296/187.08 |
| 2010/0270835 A1 | 10/2010 | Nitsuma |
| 2012/0068506 A1 * | 3/2012 | Yamaki et al. ............. 297/216.1 |
| 2013/0106153 A1 | 5/2013 | Kaku |
| 2013/0113244 A1 | 5/2013 | Kaku et al. |
| 2013/0113245 A1 | 5/2013 | Kaku et al. |

FOREIGN PATENT DOCUMENTS

| | | |
|---|---|---|
| JP | 9-169232 | 6/1997 |
| JP | 10-42995 | 2/1998 |
| JP | 11-222088 | 8/1999 |
| JP | 2000-103275 | 4/2000 |
| JP | 2001-105947 | 4/2001 |
| JP | 2007-253887 | 10/2007 |
| JP | 2007-326441 | 12/2007 |
| JP | 2009-46112 | 3/2009 |
| JP | 2009-96216 | 5/2009 |
| JP | 2009-126284 | 6/2009 |
| JP | 2009-248818 | 10/2009 |
| JP | 2011-25827 | 2/2011 |
| WO | WO 95/11818 | 5/1995 |
| WO | WO 2009/044729 | 4/2009 |
| WO | WO 2009/066730 | 5/2009 |

* cited by examiner

VEHICLE SEAT

TECHNICAL FIELD

The present invention relates to a vehicle seat in which a side collision load on a vehicle can be transmitted laterally from outside toward inside.

BACKGROUND ART

A vehicle seat comprising a seat back frame made of a pipe member shaped like a rectangular frame, a reinforcing member fixed in a position tilted from an upper portion of a laterally outer side of the frame to a lower portion of a laterally inner side of the frame has hitherto been known in the art (see JP 11-222088 A). The reinforcing member has outer ends protruding from the frame, and end portions provided with flanges.

In this vehicle seat, a side collision load imposed on one flange from a laterally outer side is transmitted through the reinforcing member and the other flange to a side laterally opposite to a side on which the one flange is provided.

With the conventional technique as mentioned above, the load can be received at a large area by the flange provided on the reinforcing member, but depending on the direction from which the load is received, the flange would possibly become deformed by the load; therefore, there is a risk of becoming unable to transmit the load satisfactorily.

Against this backdrop, the inventors named in the present application have created the present invention in the process of research for providing a vehicle seat in which the transmission of the load can be achieved satisfactorily.

SUMMARY OF INVENTION

A vehicle seat according to one aspect of the present invention comprises: left and right base frames which constitute at least left and right lower portions of a seat back frame; a force-receiving member disposed adjacent to a left or right outer side of one of the base frames, and configured to receive a load from outside in a lateral direction; and a load transmission part configured to transmit the load from the force-receiving member to a side laterally opposite to that on which the force-receiving member is provided. The force-receiving member has a shape with a closed cross section, and has an input-side end portion and an output-side end portion configured such that the input-side end portion stretches out in at least one of upward, downward, frontward and rearward directions wider than the output-side end portion.

With this configuration, since the force-receiving member has a shape with a closed section and the input-side end portion stretches out in at least one of upward, downward, frontward and rearward directions wider than the output-side end portion, the input-side end portion can be configured to have a double-wall structure as viewed from a direction in which a load is received. Accordingly, the rigidity of the force-receiving member can be increased, and thus deformation of the force-receiving member can be suppressed, so that the load can be transmitted effectively from the force-receiving member to the load transmission part.

The above configuration may be modified such that a width in a front-rear direction of a lower end portion of the input-side end portion is greater than a width in a front-rear direction of an upper end portion of the input-side end portion.

This modification ensures a sufficient area for receiving the load, and thus makes it possible to transmit the load more effectively.

Moreover, the base frame may be shaped like a pipe, and the output-side end portion of the force-receiving member may be located within a width in a front-rear direction of the base frame.

With this feature, the load received can be concentrated on the base frame, and thus the load can be transmitted more effectively.

The force-receiving member may be configured to include front and rear walls of which at least a portion has an oblique surface angled relative to a lateral direction such that a width in a front-rear direction of the force-receiving member is gradually made smaller.

With this feature, concentration of a stress (as imparted upon receipt of a load) on a part of the force-receiving member is suppressed, and thus deformation of the force-receiving member can be suppressed, so that the load can be transmitted more effectively.

The force-receiving member may be configured to include upper and lower walls of which at least a portion has an oblique surface angled relative to a lateral direction such that a width in an upward-and-downward direction of the force-receiving member is gradually made smaller.

With this feature, concentration of a stress (as imparted upon receipt of a load) on a part of the force-receiving member is suppressed, and thus deformation of the force-receiving member can be suppressed, so that the load can be transmitted more effectively.

MODE(S) FOR CARRYING OUT THE INVENTION

Hereafter, a description will be given of one embodiment of the present invention with reference to the drawings.

Figure 1:
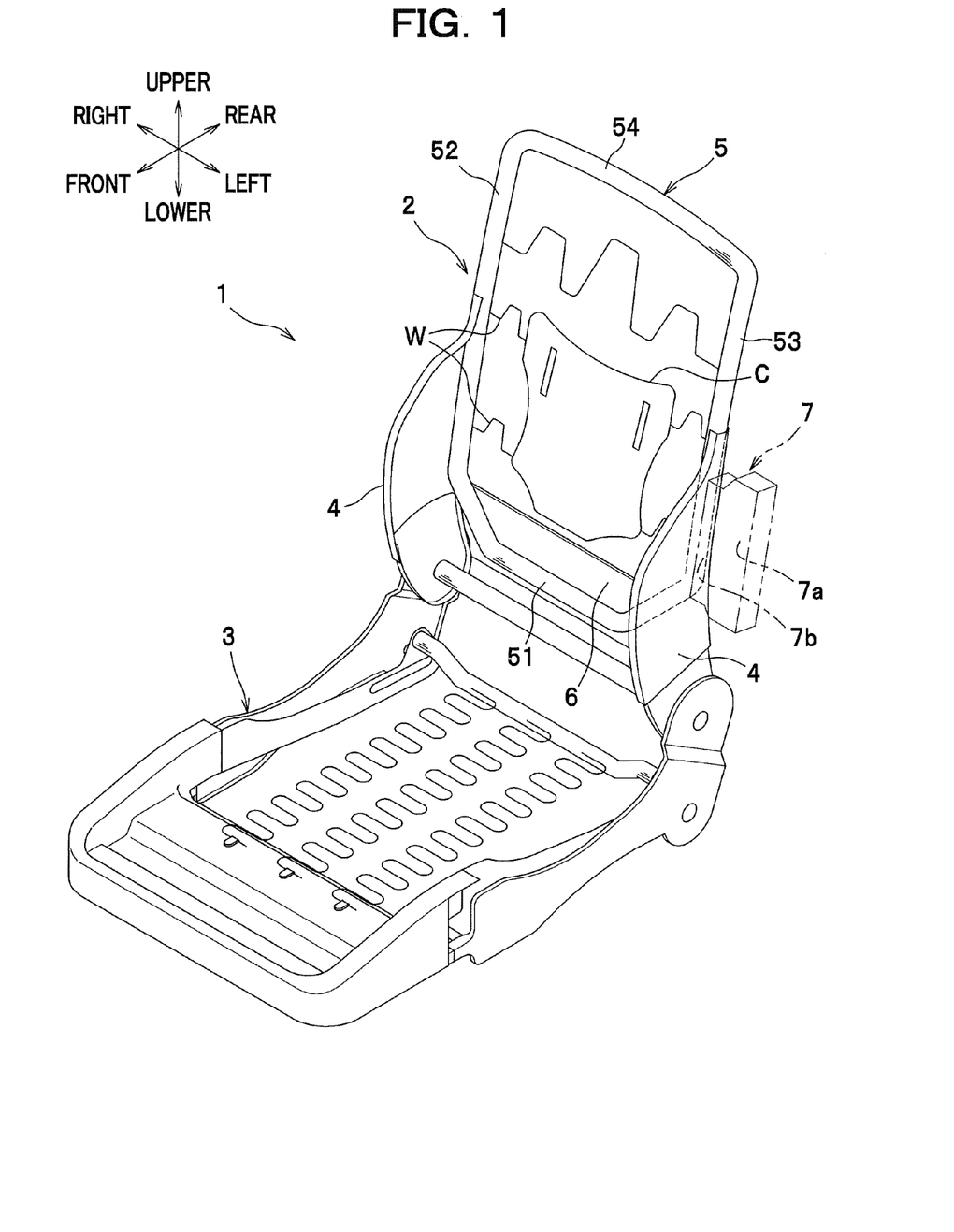
FIG. 1 is a perspective view of a vehicle seat according to one embodiment of the present invention.

A vehicle seat according to the present invention is made up of a seat frame 1 as shown in FIG. 1 the outside of which is covered with a seat cushion made of urethane foam or the like. The seat frame 1 includes a seat back frame 2 and a seat bottom frame 3. It is to be understood that in describing the present invention, the front/rear, left/right and upper/lower are defined as viewed from an occupant sitting on the seat.

The seat back frame 2 is configured to include a pair of side frames 4, a reinforcing frame for reinforcing the side frames 4, that is, a pipe frame 5, a lower frame 6, and a bracket 7 as one example of a force-receiving member.

The pipe frame 5 has a shape of a cylindrical pipe (with a closed section), and formed by bending in the shape of a substantially rectangular loop. This pipe frame 5 comprises side portions 52, 53 as one example of left and right base frames, a lower portion 51 which connects lower ends of the side portions 52, 53, and an upper portion 54 which connects upper ends of the side portions 52, 53.

The lower portion 51 of the pipe frame 5 (which includes portions extending obliquely downward from the side frames 4) is configured to serve, in combination with the lower frame 6, as a load transmission part, to transmit a load in the lateral direction.

Two wires W bent to ascend and descend several times are provided in positions spaced out vertically, and joined to left and right side portions 52, 53 of the pipe frame 5, and a pressure-receiving member C shaped like a plate and made of plastic are fixed to these wires W. With this configuration, when the vehicle receives a rear-end collision load, the occupant subsides rearward together with the pressure-receiving member C inside the pipe frame 5, and thus the impact of the rear-end collision load against the occupant can be softened.

Figure 2:
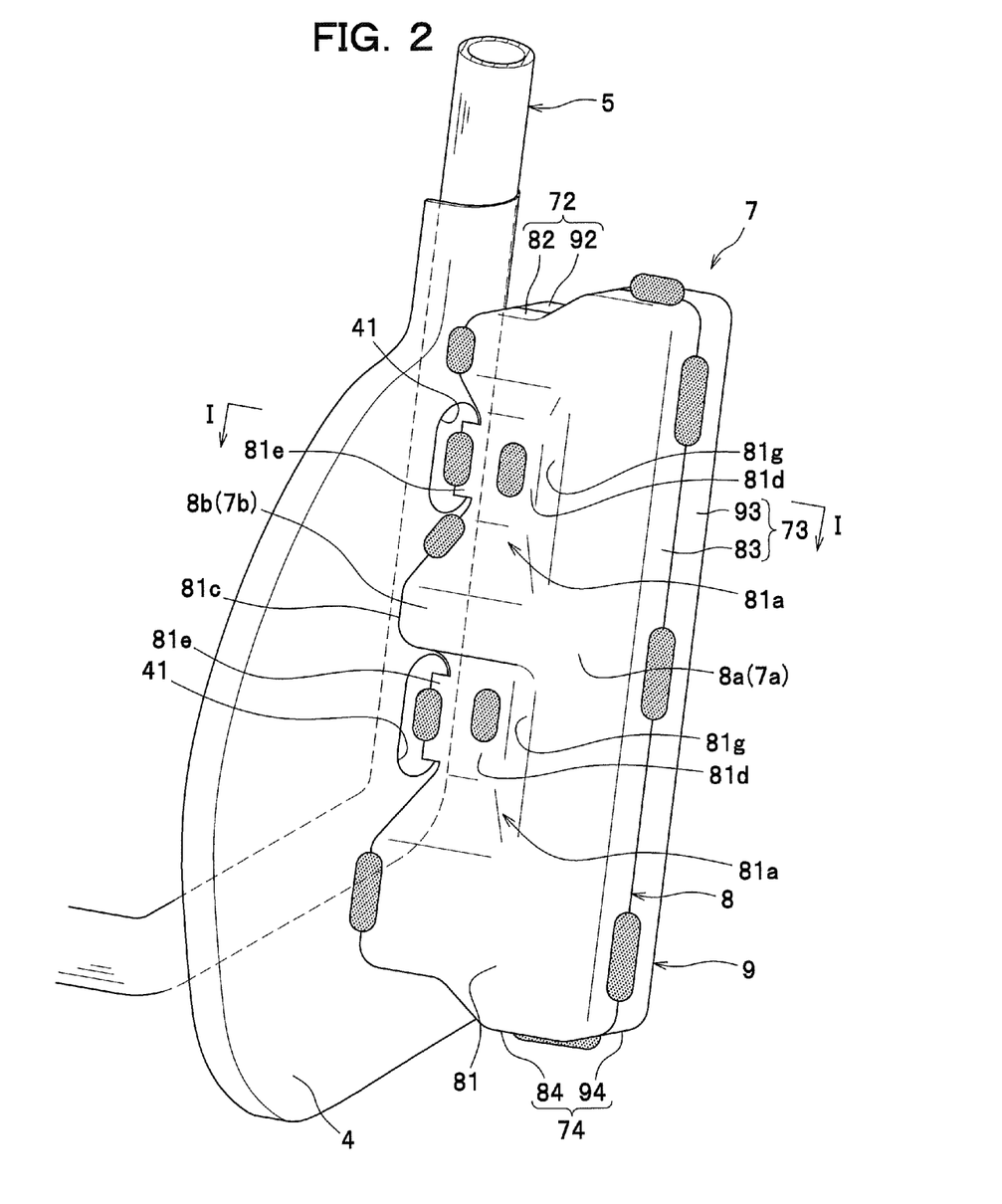
FIG. 2 is an enlarged perspective view of a bracket and its surrounding structure as viewed from the front.

The side frames 4 are plate-like members disposed adjacent, and joined, to laterally outer sides of lower portions of the pipe frame 5 (side portions 52, 53, respectively), and are configured to constitute, together with the side portions 52, 53, left and right lower portions of the seat back frame 2. As shown in FIG. 2, each side frame 4 is configured to protrude frontward (in at least one of the front and rear directions) beyond the pipe frame. This configuration provides a frontwardly overhanging shape formed at each side of the seat back, and allows an air bag or other parts to be securely fixed to the frontwardly and rearwardly to extending plate-like side frames 4.

Figure 3:
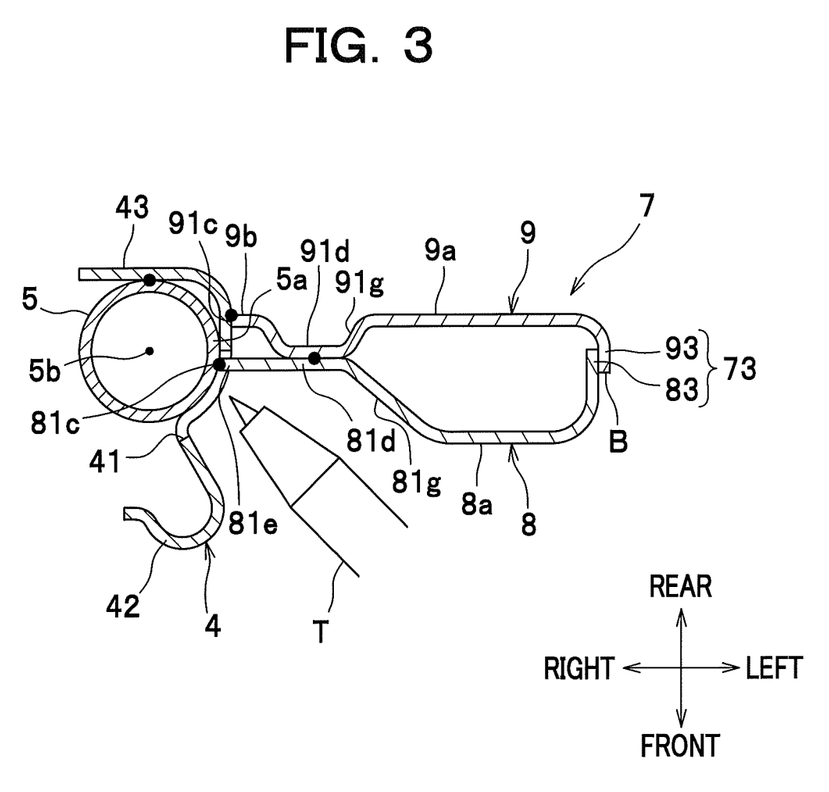
FIG. 3 shows section I-I of FIG. 2.

To be more specific, as shown in FIG. 3, each side frame 4 has a through hole 41 pierced through the left and right sides at an appropriate position thereof, and a front portion 42 thereof is bent inwardly to the left or to the right and further bent to the rear to form a U-shaped cross section. This configuration serves to improve the rigidity of the front portion 42 of the side frame 4.

A rear portion 43 of each side frame 4 is bent inwardly to the left or to the right to form an L-shaped cross section, and is joined to the pipe frame 5 by welding. In FIG. 3, welds or spots welded by a welding torch T are illustrated with exaggerated black dots.

As shown in FIG. 1, the lower frame 6 is a plate-like member extending laterally, which is joined to the lower portions of the side frames 4 and to the lower portion 51 of the pipe frame 5. With this configuration, a load imposed on the bracket 7 from outside in the left or right direction is transmitted through the lower frame 6 and the aforementioned lower portion 51 of the pipe frame 5 to the side laterally opposite to that on which the bracket 7 is provided.

The bracket 7 is a part provided discretely from the pipe frame 5 and the side frames 4, and disposed adjacent to the left side (laterally outer side) of the side portion 53 (one of the base frames) of the pipe frame 5 with the side frame 4 disposed therebetween.

This bracket 7 is configured such that a laterally outer input-side end portion 7a (outer wall 73 (see FIG. 2)) is disposed near a side panel such as a side pillar or a door of the vehicle when the vehicle seat is installed in the vehicle and that a side collision load imposed on the vehicle is received from this input-side end portion 7a (the load is received form outside in the lateral direction). Moreover, the bracket 7 is configured such that a load received from the input-side end portion 7a is outputted (transmitted) from a laterally inner output-side end portion 7b to the side frame 4 and the pipe frame 5.

Figure 4:
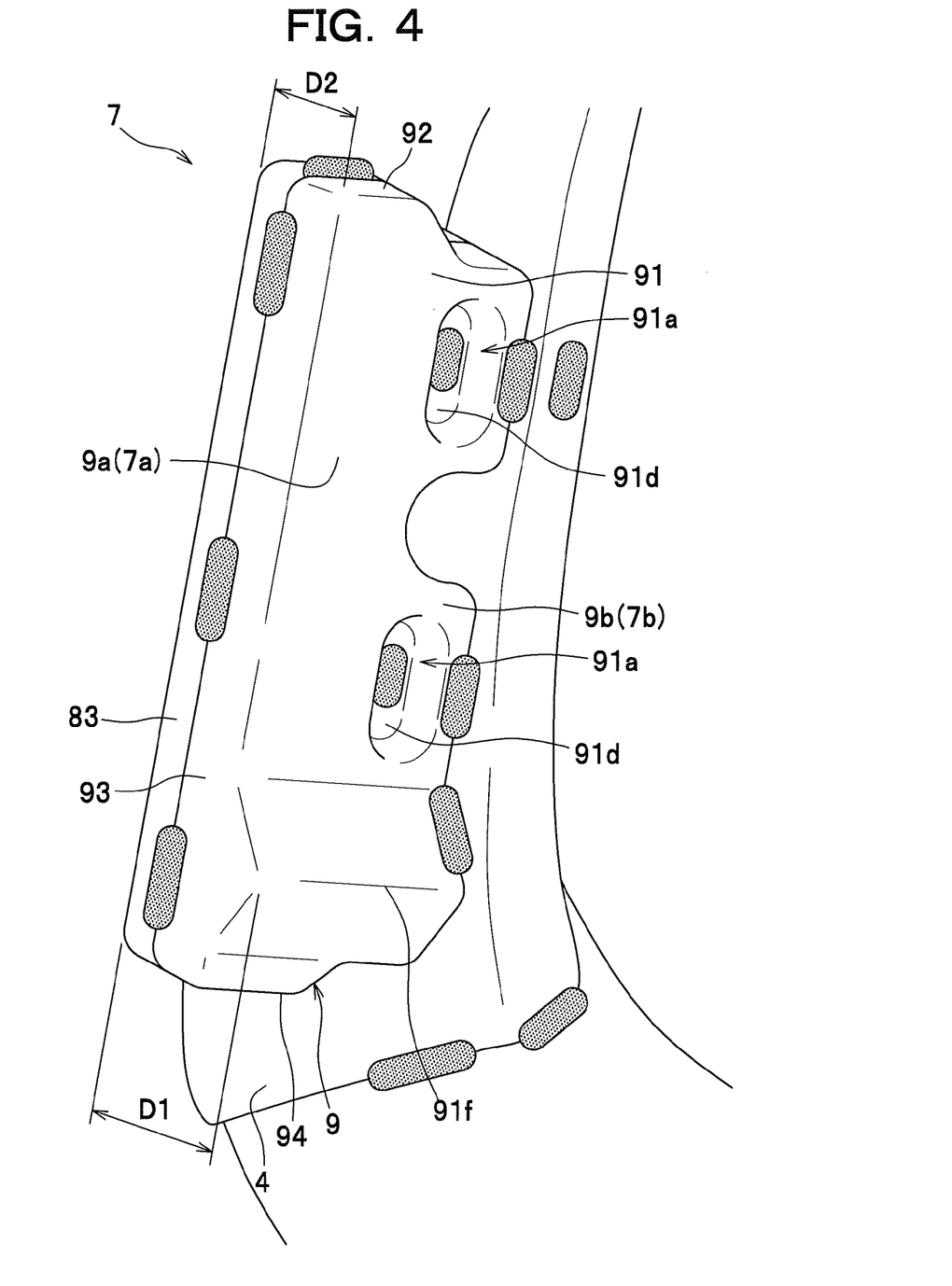
FIG. 4 is an enlarged perspective view of the bracket and its surrounding structure as viewed from the rear.

As shown in FIG. 2, the bracket 7 is directly fixed by welding to the pipe frame 5 through two through holes 41 (opening) formed in the side frame 4. With this configuration, irrespective of the angle and magnitude of the side collision load received, the load can be transmitted properly from the bracket 7 to the pipe frame 5 without getting affected by deformation of the side frame 4. In FIG. 2 and FIG. 4, the welded spots are illustrated with shades of dots.

To be more specific, the bracket 7 is segmented in front and rear halves of a front-side box-like member 8 and a rear-side box-like member 9 which are fitted together, and configured such that the box-like members 8, 9, once combined together, form a closed section as taken along a plane perpendicular to the lateral direction.

The front-side box-like member 8 includes a plate-like front wall 81 elongated in the upward-and-downward direction longer than extending in the lateral direction, an upper wall 82 extending from an upper end of the front wall 81 rearward, an outer wall 83 extending from a laterally outer end of the front wall 81 rearward, and a lower wall 84 extending from a lower end of the front wall 81 rearward, all of which are provided integrally. In other words, the front-side box-like member 8 is configured to have a shape of a box which opens to the rear and to a laterally inner side.

In the front wall 81, two recessed portions 81a (providing an uneven shape) disposed in a portion separate from upper and lower ends of the front wall 81 and configured to be recessed inwardly in the front-rear direction are arranged in positions spaced out vertically at a predetermined distance. With this configuration, the rigidity of the front wall 81 is enhanced, and thus a side collision load can be transmitted effectively to the pipe frame 5 by the high-rigidity front wall 81.

Each recessed portion 81a is formed at an output-side end portion 8b of the front wall 81, and thus opens to the front and to the laterally inner side. With this configuration, an edge 81c of the output-side end portion 8b is bent to the front and to the rear, and thus the rigidity of the edge 81c located at an output side of the side collision load can be increased, so that the side collision load can effectively be transmitted to the pipe frame 5 or the like.

As shown in FIG. 3, each recessed portion 81a has a bottom wall 81d and a left inner wall 81g extending in an obliquely rightward-and-rearward direction from the front side of the input-side end portion 8a of the front wall 81 toward the bottom wall 81d of the recessed portion 81a. In other words, the front wall 81 has an oblique surface (inner wall 81g) angled relative to the lateral direction such that a width in the front-rear direction of the bracket 7 is gradually made smaller toward a left-to-right direction. With this feature, concentration of a stress, as imparted upon receipt of a load, on a part of the front wall 81 is suppressed, and thus deformation of the bracket 7 can be suppressed, so that the load can be transmitted properly.

At the bottom wall 81d of each recessed portion 81a, as shown in FIG. 2, an extension portion 81e (part of the force-receiving member provided at a laterally inner side thereof) extending laterally inward beyond the edge 81c of the front wall 81 is formed. This extension portion 81e is disposed inside the through hole 41 of the side frame 4 described above, and extends to the pipe frame 5, so that the extension portion 81e abutting on the pipe frame 5 is welded to the pipe frame 5.

Since only the extension portion 81e is passed through the through hole 41, the through hole 41 may be sized to conform to the extension portion 81e, and thus the through hole 41 may be made smaller so that the rigidity of the side frame 4 can be enhanced. To be more specific, in the present embodiment, the through hole 41 is shaped like an elongate hole having dimensions smaller than the width of the pipe frame 5 in a front-rear direction, and smaller than the whole length of the edge 81c of the front wall 81 and greater than the extension portion 81e in a vertical direction.

The size of the through hole 41 may be designed to have, at the largest, an area comparable or smaller than a cross-sectional area of the output-side end portion 7b (a laterally inner end portion) of the bracket 7. The through hole 41 formed to have a size described above makes it possible to impart a higher rigidity of the side frame 4, for example, in comparison with a through hole formed in the side frame to have such a size as to allow the laterally inner end portion of the bracket 7 to be passed through in its entirety.

Although the extension portion 81e is provided in the present embodiment, the present invention is not limited to this configuration; i.e., a configuration without the extension portion 81e may also be possible. In this configuration, some gap may be left between the pipe frame 5 and the edge 81c of the front wall 81, but this gap still permits welding by which the pipe frame 5 and the bracket can be directly joined together.

As shown in FIG. 3, a portion (including the extension portion 81e) of the edge 81c of the output-side end portion 8b which defines the edge of the bottom wall 81d of the recessed portion 81a is located within the width in the front-rear direction of the pipe frame 5. Of this portion, the extension portion 81e is fixed to a central portion 5a located at a center in the front-rear direction of the pipe frame 5. With this configuration, the load from the bracket 7 is transmitted intensively to the central portion 5a of the pipe frame 5, and thus the load can be transmitted more effectively.

A center 5b in the front-rear direction of the pipe frame 5 is located within a width in the front-rear direction of the bracket 7. With this configuration, upon side collision, the load can be transmitted more effectively because the bracket 7 can be prevented from slipping out to the front or to the rear on a cylindrical outer surface of the pipe frame 5.

As shown in FIG. 2, an upper portion and a lower portion of the edge 81c of the front wall 81 are fixed to the side frame 4 by welding. In other words, the front wall 81 is fixed directly to both of the side frame 4 and the pipe frame 5. With this configuration, the load received by the bracket 7 is transmitted not only through the pipe frame 5 but also through the side frame 4 to the load transmission part (the lower frame 6 and the lower portion 51 of the pipe frame 5), and thus more effective transmission of the load can be ensured. It is appreciated that the load transmitted to the load transmission part can be transmitted to the vehicle body side through a console box or the like provided at a side opposite to that on which the bracket 7 is provided.

As shown in FIG. 4, the rear-side box-like member 9 includes a plate-like rear wall 91 elongated in the upward-and-downward direction longer than extending in the lateral direction, an upper wall 92 extending from an upper end of the rear wall 91 frontward, an outer wall 93 extending from a laterally outer end of the rear wall 91 frontward, and a lower wall 94 extending from a lower end of the rear wall 91 frontward, all of which are provided integrally. In short, the rear-side box-like member 9 is configured to have a shape of a box which opens to the front and to the laterally inner side.

In the rear wall 91, two recessed portions 91a (providing an uneven shape) disposed in a portion separate from upper and lower ends of the rear wall 91 and configured to be recessed inwardly in the front-rear direction are arranged in positions spaced out vertically at a predetermined distance. With this configuration, the rigidity of the rear wall 91 is enhanced, and thus a side collision load can be transmitted effectively to the laterally inner side by the high-rigidity rear wall 91.

As shown in FIG. 3, each recessed portion 91a has a bottom wall 91d and a left inner wall 91g extending in an obliquely rightward-and-frontward direction from the rear side of the input-side end portion 9a of the rear wall 91 toward the bottom wall 91d. In other words, the rear wall 91 has an oblique surface (inner wall 91g) angled relative to the lateral direction such that a width in the front-rear direction of the bracket 7 is gradually made smaller toward a left-to-right direction. With this feature, concentration of a stress, as imparted upon receipt of a load, on a part of the rear wall 91 is suppressed, and thus deformation of the bracket 7 can be suppressed, so that the load can be transmitted properly.

Each recessed portion 91a is disposed opposite to a corresponding recessed portion 81a of the front-side box-like member 8 in the front-rear direction, whereas each bottom wall 91d and a bottom wall 81d of a corresponding recessed portion 81a are disposed to adjoin to each other. With this configuration, the two bottom walls 81d, 91d adjoining to each other constitute a thick portion located substantially at the center in the front-rear direction of the bracket 7, and thus effective transmission of the side collision load can be achieved.

The two bottom walls 81d, 91d adjoining to each other are joined together by welding. With this configuration, the rigidity of the bracket 7 can be enhanced, and thus effective transmission of the side collision load can be achieved.

The two bottom walls 81d, 91d adjoining to each other are located within a width in the front-rear direction of the pipe frame 5. With this feature, the side collision load can be effectively transmitted to the pipe frame 5 through the thick portion made up of the adjoining bottom walls 81d, 91d.

Furthermore, the center 5b in the front-rear direction of the pipe frame 5 is located within a width in the front-rear direction of the thick portion made up of the adjoining bottom walls 81d, 91d. With this configuration, the load can be transmitted intensively to the center 5b or therearound of the pipe frame 5 through the thick portion made up of the adjoining bottom walls 81d, 91d.

An edge 91c of the output-side end portion 9b in an upper portion (extending from the lower recessed portion 91a above) of the rear wall 91 is located within the width in the front-rear direction of the pipe frame 5. With this configuration, the output-side end portion 9b, specifically the edge 91c and the edge 81c (defining the edge of the bottom wall 81d) of the front wall 81 is located within the width of the pipe frame 5 (base frame) in the front-rear direction. As a result, the load received is transmitted intensively to the pipe frame 5, and thus the load can be transmitted properly.

As shown in FIG. 4, the output-side end portion 9b of the rear wall 91 is fixed to the side frame 4 by welding. To be more specific, as shown in FIG. 3, the output-side inner end portion 9b of the rear wall 91 is joined to a closed-section-shaped portion made up of a rear portion 43, bent into an L-shape, of the side frame 4 and a left-side rear portion of the pipe frame 5. With this configuration, the side collision load transmitted from the rear wall 91 to a laterally inner side is received properly by the closed-section-shaped portion, and thus can be transmitted effectively to the pipe frame 5.

As shown in FIG. 2, the upper wall 92, outer wall 93 and lower wall 94 of the rear-side box-like member 9 is disposed over the upper wall 82, outer wall 83 and lower wall 84 of the front-side box-like member 8, and fixed to the walls 82-84, respectively by welding.

With this configuration, as shown in FIG. 3, the outer wall 73 of the bracket 7 has a stepped profile B (providing an uneven shape) formed, at a position separate from the front and rear ends thereof, by overlapping the outer walls 83, 93 (two plate-like portions) of the respective box-like members 8, 9. With this configuration, a portion of the outer wall 73 substantially at the center thereof in the front-rear direction is formed as a thick portion by overlapping the outer walls 83, 93, and thus the rigidity of the outer wall 73 can be enhanced, so that a side collision load can be transmitted effectively.

Similarly, the upper wall 72 and lower wall 74 of the bracket 7 also have stepped profiles B (not shown) formed by overlapping the upper walls 82, 92 and the lower walls 84, 94, respectively, of the box-like members 8, 9. That is, on the upper wall 72, outer wall 73 and lower wall 74 of the bracket 7, the stepped profile B is formed continuously across the walls 72-74, as a result of fitting the rear-side box-like member 9 on the front-side box-like member 8.

With this configuration, the thick portion of the outer wall 73 is formed continuously to the thick portions of the upper wall 72 and the lower wall 74, and thus a side collision load received by the thick portion of the outer wall 73 can be transmitted effectively toward the laterally inner side through the upper and lower continuous thick portions.

As shown in FIG. 4, the rear wall 91 has a lower end portion 91*f* formed to bulge rearward in a substantially ridge-like shape. With this configuration, the bracket 7 is made to have a width D1 in a front-rear direction of its lower end portion greater than a width D2 in the front-rear direction of its upper end portion. As a result, a sufficient area for receiving the load is provided, and the rigidity of the lower end portion, in which load transmission occurs principally, of the bracket 7 is increased, and thus the load can be transmitted effectively.

Figure 5:
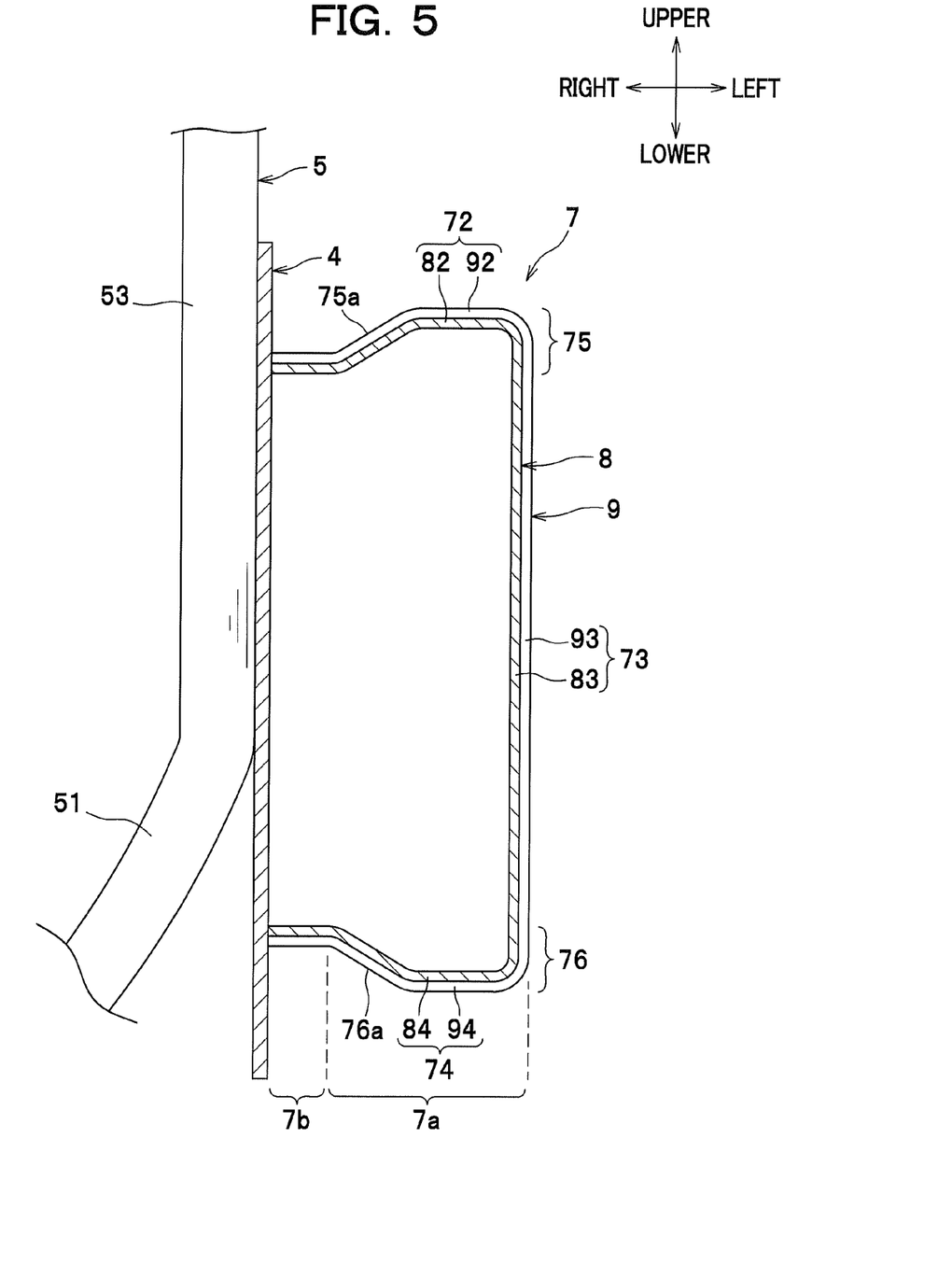
FIG. 5 is a sectional view of the bracket.

As shown in FIGS. 2, 4, each box-like member 8, 9 (bracket 7) is configured such that the input-side end portion 7*a* (8*a* and 9*a*) stretches out in upward and downward directions wider than the output-side end portion 7*b* (8*b* and 9*b*). To be more specific, as shown in FIG. 5, the bracket 7 has a shape with a closed cross section, and left-side portions (on the laterally outer sides) of the upper wall 72 and the lower wall 74 bulge out upward or downward.

With this configuration, the bulged portions of the bracket 7, that is, an upper end portion (bulge 75) and a lower end portion (bulge 76) of the input-side end portion 7*a* have a double-wall structure in the lateral direction that is a direction in which a load is received. As a result, the rigidity of the bracket 7 can be enhanced, and thus deformation of the bracket 7 can be suppressed, so that the load can be transmitted properly. Furthermore, a wider area of the input-side end portion 7*a* (outer wall 73) provided by the bulges 75, 76 makes it possible to reliably receive a load.

Right-side (laterally inner side) walls 75*a*, 76*a* (portions of upper wall 72 and lower wall 74) of the bulges 75, 76 provide oblique surfaces which extend from an upper end and a lower end of the bulges 75, 76, respectively, and are angled relative to the lateral direction, such that a width in the upward-and-downward direction of the bracket 7 is gradually made smaller toward the side frame 4. With this configuration, concentration of a stress (as imparted upon receipt of a load) on a part of the upper wall 72 or the lower wall 74 is suppressed, and thus deformation of the bracket 7 can be suppressed, so that the load can be transmitted properly.

Advantageous effects of the vehicle seat according to the present embodiment as described above are summarized hereinafter.

Since the bracket 7 has a shape with a closed section and the input-side end portion 7*a* stretches out in upward and downward directions wider than the output-side end portion 7*b*, the rigidity of the bracket 7 can be increased. Accordingly, deformation of the bracket 7 can be suppressed, and thus the load can be transmitted properly from the bracket 7 to the pipe frame 5 and the lower frame 6.

Since the width D1 in the front-rear direction of the lower end portion of the input-side end portion 7*a* is greater than the width D2 in the front-rear direction of the upper end portion of the input-side end portion 7*a*, it is ensured that a sufficient area for receiving the load is provided, and thus the load can be transmitted more effectively. In particular, since the transmission of the load in the present embodiment occurs at a lower position through the load transmission part (the lower frame 6 and the lower portion 51 of the pipe frame 5), the greater width D1 in the front-rear direction of the input-side end portion 7*a* contributes to improved transmission of the load.

Since the output-side end portion 7*b* of the bracket 7 is located within the width in the front-rear direction of the pipe frame 5, the load received can be concentrated on the pipe frame 5, so that the load can be transmitted more effectively.

Since the front wall 81 and the rear wall 91 of the bracket 7 include oblique surfaces (inner walls 81*g*, 91*g*) angled relative to the lateral direction such that the width in the front-rear direction of the bracket 7 is gradually made smaller, deformation of the bracket 7 can be suppressed, and thus the load can be transmitted more effectively.

Since the upper wall 72 and the lower wall 74 of the bracket 7 include oblique surfaces (walls 75*a*, 76*a*) angled relative to the lateral direction such that the width in the upward-and-downward direction of the bracket 7 is gradually made smaller, deformation of the bracket 7 can be suppressed, and thus the load can be transmitted more effectively.

Since the bracket 7 is not fixed through the side frame 4 but fixed directly to the pipe frame 5, the side collision load received, irrespective of its angle and magnitude, can be transmitted properly from the bracket 7 to the pipe frame 5 without getting affected by deformation of the side frame 4.

Since the bracket 7 is provided discretely from the pipe frame 5, each member can be formed into any shape freely, and can be made easy to assemble.

Since the bracket 7 and the pipe frame 5 are fixed together through an opening (through hole 41) formed in the side frame 4, the need, for example, to divide the side frame into front and rear parts or upper and lower parts so as to detour around a position in which the bracket and the pipe frame are fixed together can be obviated, and thus the rigidity of the side frame 4 can be enhanced.

Since only part (extension portion 81*e*) of the bracket 7 is fixed to the pipe frame 5 through the opening (through hole 41), the need to form an opening allowing an entire side portion at a laterally inner side of the bracket to pass therethrough in the side frame can be obviated, and thus the rigidity of the side frame 4 can be further enhanced.

Since the opening formed in the side frame 4 is configured as a through hole 41, the rigidity of the side frame 4 can be further enhanced, in comparison with a configuration in which the opening is shaped as a groove (or a hollow) that opens to the front or to the rear, because an upper portion and a lower portion of the side frame 4 above and below the position in which the bracket 7 and the pipe frame 5 are fixed together can be connected at the front and rear sides of that position.

Since the bracket 7 is fixed to a portion of the pipe frame 5 having a shape with a closed section, the load received by the bracket 7 can be transmitted properly to the load transmission part (the lower frame 6 and the lower portion 51 of the pipe frame 5) through the pipe frame 5 which can be resistant to deformation.

Since the bracket 7 is fixed directly to the both of the side frame 4 and the pipe frame 5, the load received by the bracket 7 is transmitted not only through the pipe frame 5 but also through the side frame 4 to the load transmission part, and thus the load can be transmitted more effectively.

Since the center 5*b* of the pipe frame 5 is located within the width in the front-rear direction of the bracket 7, the bracket 7 upon receipt of side collision load can be prevented from slipping out to the front or to the rear on a cylindrical outer surface of the pipe frame 5, and thus, the load can be transmitted more effectively.

Since the bracket 7 is fixed to the portion 5*a* located at a center in the front-rear direction of the pipe frame 5, the load from the bracket 7 can be transmitted intensively to the central portion 5*a* at the center in the front-rear direction of the pipe frame 5, and thus, the load can be transmitted more effectively.

Although the embodiment of the present invention has been described above, the present invention may be carried out into practice in appropriately modified configurations, as in the other embodiments described below.

In the above-described embodiment, the base frame (the side portions 52, 53 of the pipe frame 5) is configured to have a shape of a cylindrical pipe, but the present invention is not limited to this configuration; for example, a shape of a pipe having a polygonal cross section, a solid cylindrical member, or a solid prismatic member may be adopted.

In the above-described embodiment, the force-receiving member is embodied in the bracket 7 composed of two box-like members 8, 9, but the present invention is not limited to this configuration; for example, a bracket composed of a single box-like member may be usable.

In the above-described embodiment, the load transmission part is configured as an assembly of the lower frame 6 and the lower portion 51 of the pipe frame 5, but the present invention is not limited to this configuration. For example, in the above-described embodiment, the load transmission part (lower portion 51) is formed integrally with the pipe frame 5 as the base frame, but if the pipe frame is shaped like a letter U which opens toward downward, a separate frame connecting the lower end portions of the pipe frame may be provided as a load transmission part. Alternatively, if the lower portion 51 of the pipe frame 5 in the above-described embodiment is severed, with its midsection cut off, in two portions joined to the lower frame 6, the lower portions 51 extending halfway and the lower frame 6 may be configured as a load transmission part.

In the above-described embodiment, the bracket 7 and the pipe frame 5 are fixed together by welding, but the present invention is not limited to this configuration; for example, a bolt may be applied for fixing these members together.

In the above-described embodiment, the through hole 41 is configured to serve as an opening, but the present invention is not limited to this configuration; for example, the opening may be a hollow which opens to the front or to the rear.

In the above-described embodiment, part of the bracket 7 (extension portions 81*e*) is passed through the opening (through holes 41), but the present invention is not limited to this configuration; part of the base frame may be passed through the opening and fixed directly to the bracket.

In the above-described embodiment, the bracket 7 is directly fixed to the pipe frame 5, but the present invention is not limited to this configuration; for example, it may be fixed only to the side frame configured according to the above-described embodiment.

In the above-described embodiment, the seat back frame 2 includes the side frame 4, but the present invention is not limited to this configuration; for example, an alternative configuration having no side frame provided may be adopted.

In the above-described embodiment, the base frame (pipe frame 5) is configured to have a shape with a closed section in its entirety, but the present invention is not limited to this configuration; it may be advantageous only if at least a portion of the base frame to which the force-receiving member is fixed has a shape with a closed section.

In the above-described embodiment, the front wall 81 and the rear wall 91 have oblique surfaces (inner walls 81*g*, 91*g*) angled relative to the lateral direction such that the width in the front-rear direction of the bracket 7 is gradually made smaller, but the present invention is not limited to this configuration. For example, an alternative configuration such that only either one of the front wall 81 or the rear wall 91 has such an oblique surface, or another configuration in which neither of them has such an oblique surface may be feasible.

Similarly, in the above-described embodiment, the upper wall 72 and the lower wall 74 have oblique surfaces (walls 75*a*, 76*a*) angled relative to the lateral direction such that the width in the upward-and-downward direction of the bracket 7 is gradually made smaller, but the present invention is not limited to this configuration. For example, an alternative configuration such that only either one of the upper wall 72 or the lower wall 74 has such an oblique surface, or another configuration in which neither of them has such an oblique surface.

In the above-described embodiment, the output-side end portion 8*b* of the front wall 81 is configured such that only part (portion which defines an edge of the bottom wall 81*d*) of the edge 81*c* is located within the width of the pipe frame 5 in the front-rear direction, but the present invention is not limited to this configuration; for example, the entire edge of the output-side end portion may be located within the width of the pipe frame 5.

In the above-described embodiment, the bracket 7 (the input-side end portion 7*a* and the output-side end portion 7*b*) is configured such that the width D1 in the front-rear direction of its lower portion is greater than the width D2 in the front-rear direction of its upper portion, but the present invention is not limited to this configuration; for example, the width in the front-rear direction of the lower portion of the force-receiving member and the width in the front-rear direction of the upper portion of the force-receiving member may be equal to each other. An alternative configuration in which only the input-side end portion is configured to have a width in the front-rear direction of its lower portion greater than a width in the front-rear direction of its upper portion.

In the above-described embodiment, the bracket 7 (force-receiving member) is configured such that its input-side end portion 7*a* stretches out in the upward and downward directions wider than its output-side end portion 7*b*, but the present invention is not limited to this configuration; for example, the force-receiving member may be configured such that its input-side end portion stretches out in the frontward and/or rearward directions wider than its output-side end portion. Alternatively, the force-receiving member may be configured such that its input-side end portion stretches out in the upward, downward, frontward and rearward directions wider than its output-side end portion.

The invention claimed is:

1. A vehicle seat, comprising:
left and right base frames that constitute at least left and right lower portions of a seat back frame;
a force-receiving member disposed adjacent to a left or right outer side of one of the base frames, the force-receiving member configured to receive a load from outside in a lateral direction; and
a load transmission part configured to transmit the load from the force-receiving member to a side laterally opposite to that on which the force-receiving member is provided,
wherein the force-receiving member has a shape with a closed cross section, and has an input-side end portion and an output-side end portion configured such that the input-side end portion stretches out in at least one of upward, downward, frontward and rearward directions wider than the output-side end portion, and the input-side end portion has a lower end portion and an upper end portion configured such that a width along a front-rear direction of the lower end portion is greater than a width along the front-rear direction of the upper end portion.

2. The vehicle seat according to claim 1, wherein the base frame is shaped like a pipe, and the output-side end portion of the force-receiving member is located within a width in a front-rear direction of the base frame.

3. The vehicle seat according to claim 1, wherein the force-receiving member includes front and rear walls of which at least a portion has an oblique surface angled relative to a lateral direction such that a width in a front-rear direction of the force-receiving member is gradually made smaller.

4. The vehicle seat according to claim 1, wherein the force-receiving member includes upper and lower walls of which at least a portion has an oblique surface angled relative to a lateral direction such that a width in an upward-and-downward direction of the force-receiving member is gradually made smaller.

* * * * *